March 2, 1926. 1,575,587
P. E. HAYNES
SEPARATION OF GASEOUS OR LIQUID MIXTURES
Filed Sept. 2, 1919
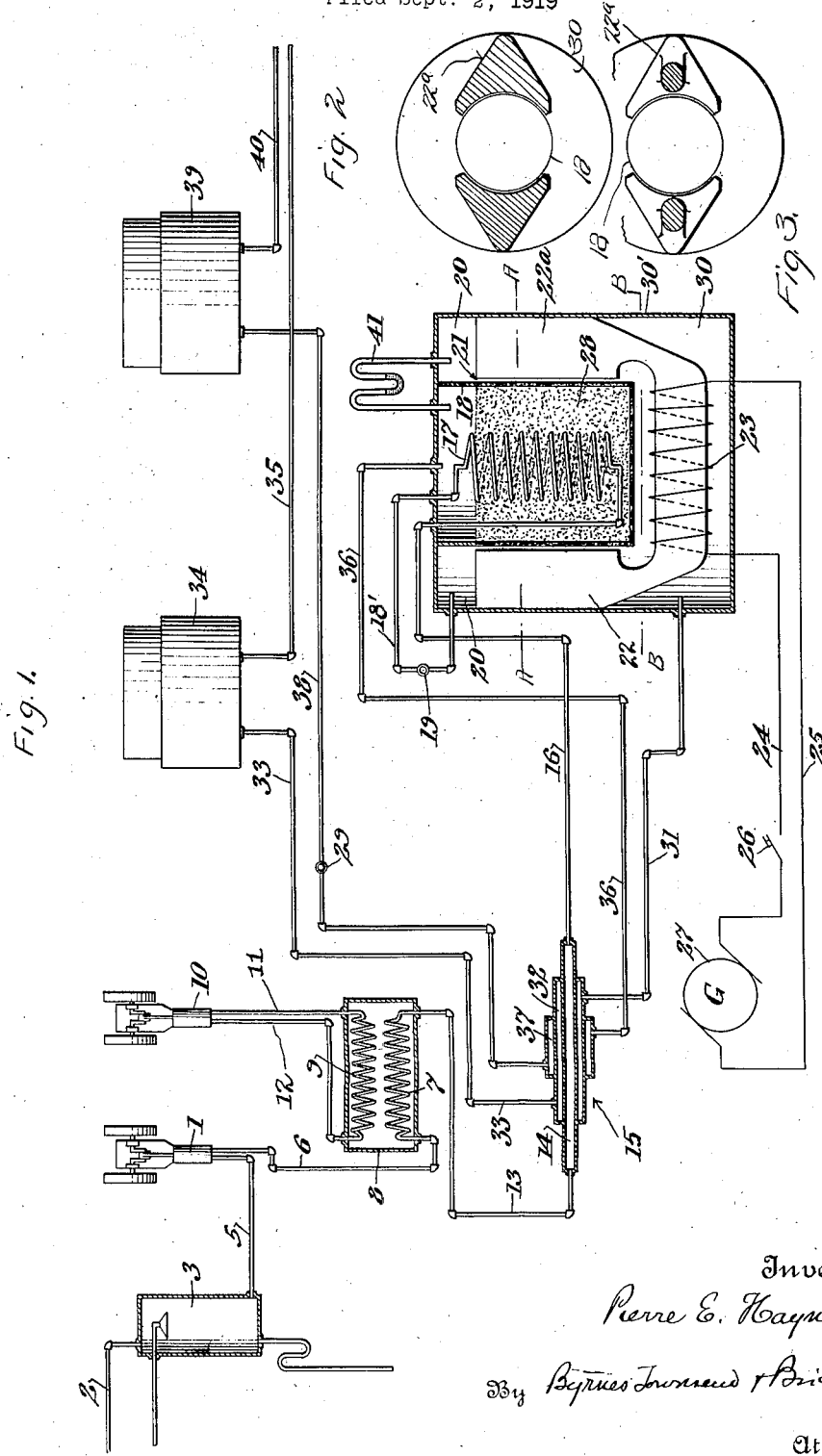
Inventor
Pierre E. Haynes
By Byrnes Townsend & Birckenstein
Attorneys Patented Mar. 2, 1926.

1,575,587

UNITED STATES PATENT OFFICE.

PIERRE E. HAYNES, OF BUFFALO, NEW YORK, ASSIGNOR TO THE LINDE AIR PRODUCTS COMPANY, OF NEW YORK, N. Y., A CORPORATION OF OHIO.

SEPARATION OF GASEOUS OR LIQUID MIXTURES.

Application filed September 2, 1919. Serial No. 321,205.

*To all whom it may concern:*

Be it known that I, PIERRE E. HAYNES, a citizen of the United States, residing at Buffalo, in the county of Erie and State of New York, have invented certain new and useful Improvements in Separation of Gaseous or Liquid Mixtures, of which the following is a specification.

This invention relates to the separation of gaseous or liquid mixtures and its chief object is to provide a simple and effective process or method whereby relatively pure materials of different magnetic susceptibility may be produced from crude mixtures by treatment in a magnetic field.

In the separation of gaseous or liquid mixtures it is obvious that certain attractive or gravitational forces between dissimilar particles or molecules must be overcome. The molecular attractive force acting between particles varies inversely as the square of the distance between the particles. It is well known that gases and liquids have the power of diffusion caused by a condition of molecular turbulence or agitation and that the velocity of this turbulence decreases with decrease in temperature.

My invention is based upon the use of a magnetic field to lessen this tendency to diffusion, and thereby obtain a concentration of one or more of the ingredients having greater magnetic susceptibility than some other ingredient.

My invention will be more readily understood by consideration of a specific example, such as the production from liquid air or vapor of same of a component containing a considerably increased amount of oxygen.

It has heretofore been proposed in U. S. Patent 1,056,043, patented March 18, 1913, to A. Cressy Morrison (see also Journal of the American Chemical Society, Vol. 37, page 1715) to distill liquid air in a strong magnetic field; and in U. S. Patent 1,273,929, patented July 30, 1918 is described another method of utilizing a strong magnetic field to produce from liquid or vapor air a concentration of oxygen in one of the distillation fractions.

The present invention is an improvement on these prior methods and comprises the interposition between the source of liquid and a magnetic field, of a permeable septum or porous barrier and maintaining a gas or liquid pressure or both, on one side of the permeable septum, which is greater than that on the other side. At the same time the strength of the magnetic field is maintained at such a degree that the ingredient of greater magnetic susceptibility (e. g. oxygen) is caused to pass through the permeable septum, while the component of less magnetic susceptibility (e. g. nitrogen) remains on the outside of the permeable septum.

In the drawings Fig. 1 is a diagrammatical representation of an apparatus for carrying out the invention; and Figs. 2 and 3 are sectional views on the lines A—A and B—B respectively in Fig. 1.

Referring to the drawing, 1 is a compressor which draws atmospheric air through pipe 2 and purifier 3 for the removal of carbon dioxid and similar impurities and finally through pipe 5 to compressor 1 where it is raised to a pressure not to exceed 3000 lbs. per square inch and passed through pipe 6 to coil 7 of a precooler 8. Precooler 8 is cooled by any suitable refrigerant such as ammonia or carbon dioxid circulated through coil 9 by compressor 10 through pipes 11 and 12. The compressed and precooled air is passed through pipe 13 to section 14 of a heat exchanger 15 where it is cooled by cold low pressure gases passing countercurrent. From the heat exchanger the cold compressed air is forced through pipe 16 to coil 17 in vessel 18. From coil 17 the cold compressed air is forced through pipe 18' to expansion valve 19 where it is expanded to a low pressure, for example about 10 lbs. per square inch.

After the apparatus is in equilibrium, the expansion of the cold compressed air at valve 19 results in a partial liquefaction of the expanding material with the further result that a mixture of liquid and vapor of air flows through space 20 which is an annular space surrounding vessel 18 and having as its only exit a narrow annular space numbered 21, through which the liquid and vapor flow downward. 22 and 22ª are the poles of an electro-magnet provided with a winding 23 which is connected by wires 24 and 25 through switch 26 to generator 27. This winding is preferably located within the space 30 of a receptacle 30' within which the magnet is located. As this space 30 is at a very low temperature, the resistance of the conductor is materially decreased, the energy loss decreased, and the current-carrying capacity of the conductor greatly increased. By closing switch 26 a magnetic field is established in the annular space 21 and on the inside of the vessel 18 which is filled with small particles of iron, denoted by the number 28. This vessel, or a portion thereof, constitutes the porous septum or barrier, above referred to, and may be made of any suitable porous material. In practice, porous vessels made of alundum or graphite have been found to be effective. The establishment of the magnetic field tends to draw the para-magnetic substances of the liquid mixture (passing down through annular orifice 21) into the vessel 18 which has porous walls capable of being permeated by the liquid flowing down through annular orifice 21, thereby tending to increase the pressure within the vessel. The liquid collecting in vessel 18 surrounds coil 17, and because of the difference in temperature, the liquid collecting around coil 17 is boiled and the high pressure gas in coil 17 is reciprocally cooled and the liquefaction taking place at expansion valve 19 is accelerated. The boiling of the liquid in vessel 18 by the passage of a warmer gas in coil 17 also causes the production of a higher pressure inside of vessel 18 than exists outside in space 20. By manipulation of valve 29 the pressure in vessel 18 is so adjusted that no liquid can flow by gravity alone through the porous wall into vessel 18, but by means of the magnetic field the pressure in vessel 18 is overcome and the para-magnetic constituent of the liquid flowing through annular orifice 21 is attracted into the vessel 18. The material not attracted into the magnetic field, which consists mostly of nitrogen, passes down through annular orifice 21 into space 30 and is withdrawn through pipe 31 to section 32 of heat exchanger 15 from whence it flows through pipe 33 to gasometer 34. From here it may be drawn as desired through pipe 35. The vapors arising in vessel 18, which consist mostly of oxygen, may be withdrawn through pipe 36 to section 37 of heat exchanger 15 and pass through valve 29 and pipe 38 to gasometer 39, whence it may be drawn through pipe 40 as desired. A manometer 41 may be used to indicate the difference in pressure between that inside the porous vessel 18 and that in the chamber 20.

In general the best operating conditions are considered to be those yielding an intensity of magnetization of the substance having the greater magnetic susceptibility, very much in excess of the force of gravitational or molecular cohesion. While capable of yielding favorable results, the liquid condition is not so desirable as a vapor condition at or near the temperature of the boiling liquid, or as that high pressure gaseous condition but slightly above the critical temperature of the gas. In the latter case the pressure may and should usually be increased with advantage until the vapor density of the gas approaches or approximates the liquid density of the mixtures.

The oxygen and nitrogen which are both para-magnetic have magnetic susceptibilities differing to a relatively large degree. The intensity of magnetization is directly proportional to the magnetic susceptibilities, so that from the equation $$\frac{Ko}{Kn} = \frac{324.0}{0.280} = 1157,$$

the liquid oxygen would be magnetized 1157 times as much as the liquid nitrogen, $Ko$ and $Kn$ being the coefficients of magnetic susceptibility of oxygen and nitrogen, respectively. A slightly greater pressure maintained inside the porous vessel, together with the frictional resistance offered by the fine pores, will tend to exclude the nitrogen.

I claim:—

1. The method of separating fluid mixtures having fluid constituents of different magnetic susceptibilities, which consists in passing a stream of the mixture through a conduit having a permeable wall and magnetically acting upon the mixture transversely of the stream to cause the constituent having the greater magnetic susceptibility to pass through the permeable wall out of the stream.

2. The method of separating fluid mixtures having fluid constituents of different magnetic susceptibilities, which consists in passing the mixture through a conduit having a porous wall and magnetically attracting the constituent having the greater magnetic susceptibility from without the porous wall causing it to pass through the porous wall out of the stream.

3. The method of separating fluid mixtures having fluid constituents of different magnetic susceptibilities, which consists in passing a stream of the mixture in downward direction through a conduit having a permeable wall and magnetically acting upon the mixture transversely of the stream to cause the constituent having the greater magnetic susceptibility to pass through the permeable wall out of the stream.

4. The method for the treatment of mixtures of fluid constituents of different magnetic susceptibilities which comprises attracting the constituent of greater magnetic susceptibility into a magnetic field and simultaneously interposing pressure and frictional resistance to prevent the flow of other components into the magnetic field.

5. The method for the separation of mixtures of fluid constituents having different magnetic susceptibilities which consists of attracting the constituent of the mixtures of higher magnetic susceptibility from a region of low pressure through a porous septum into a region of higher pressure.

6. The method for the separation of mixtures of fluid constituents having different magnetic susceptibilities which comprises attracting the constituent of the mixtures having greater magnetic susceptibility from a region of low pressure into a region of higher pressure.

7. The method of treating a fluid mixture having fluid constituents of different magnetic susceptibilities, which consists in subjecting a stream of the mixture to magnetic forces causing movement of a constituent having a relatively higher magnetic susceptibility out of the stream, and passing the removed constituent away under such conditions as to maintain a pressure in excess of the pressure of the mixture.

8. The method of separating oxygen from nitrogen in air which consists in causing the air to flow past a permeable septum within a strong magnetic field, and maintaining a region of greater pressure on the side of said septum opposite the air, whereby the oxygen is attracted into the region of greater pressure.

9. The method of preventing diffusion of fluids, having different magnetic susceptibilities, from regions of higher pressure to regions of lower pressure separated by a porous septum which consists in maintaining a magnetic field within said higher pressure region.

10. Apparatus for separating the fluid constituents of fluid mixtures, comprising a conduit having a porous wall, magnetic means for acting upon the mixture to cause the constituent of greater susceptibility to pass through the porous wall out of the stream and means for passing the mixture into one end of the conduit.

11. Apparatus according to claim 10 in which the conduit is disposed substantially vertically and the mixture is passed downwardly therethrough.

12. Apparatus for separating the fluid constituents of fluid mixtures, comprising a gas-tight chamber, a vessel centrally disposed therein having a porous wall, magnetic means operative to exert an attractive force from without the vessel through the wall thereof and means for maintaining a higher pressure within the vessel than in the chamber.

13. Apparatus according to claim 12 in which the walls of the chamber and the walls of the vessel define a vertical interspace.

14. Apparatus according to claim 12 in which the walls of the chamber and the wall of the vessel define a vertical interspace and including an inlet for the mixture into the interspace near the top thereof, an outlet near the bottom thereof and an outlet from the upper portion of the said vessel.

15. Apparatus according to claim 12 in which the magnetic means include a mass of iron particles in the vessel.

In testimony whereof, I affix my signature.

PIERRE E. HAYNES.